(12) United States Patent
Blatter et al.

(10) Patent No.: US 6,500,385 B1
(45) Date of Patent: Dec. 31, 2002

(54) CONTINUOUS METHOD FOR REUSING COATING POWDER WASTE AND COATING POWDERS THUS OBTAINED

(75) Inventors: Karsten Blatter, Erftstadt (DE); David Montgomery, Köln (DE); Heléne Bolm, Västervik (SE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/529,748
(22) PCT Filed: Oct. 28, 1998
(86) PCT No.: PCT/EP98/06843
§ 371 (c)(1), (2), (4) Date: Apr. 19, 2000
(87) PCT Pub. No.: WO99/23176
PCT Pub. Date: May 14, 1999

(30) Foreign Application Priority Data

Oct. 31, 1997 (DE) .......................................... 197 48 159

(51) Int. Cl.$^7$ ................................................. B22F 1/00
(52) U.S. Cl. .......................................... 419/33; 419/50
(58) Field of Search ..................................... 419/33, 50

(56) References Cited

FOREIGN PATENT DOCUMENTS

| DE | 40 28 567 A1 | 3/1992 |
|----|--------------|--------|
| EP | 0 683 199 A2 | 11/1995 |
| EP | 0 982 380 A1 | 3/2000 |
| WO | WO 91/18951  | 12/1991 |
| WO | WO 98/33848  | 8/1998 |

*Primary Examiner*—Daniel J. Jenkins
(74) *Attorney, Agent, or Firm*—Steven C. Benjamin

(57) ABSTRACT

Process for working up powder coating waste to yield reusable powder coatings by compacting the powder coating waste without complete melting to yield a sintered product, in which process powder coating residues arising during powder coating production are continuously separated, continuously compacted and the compacted product is continuously ground together with fresh material to be ground of the same batch of powder coating without extrusion to yield a powder coating.

10 Claims, 1 Drawing Sheet

Figure 1:
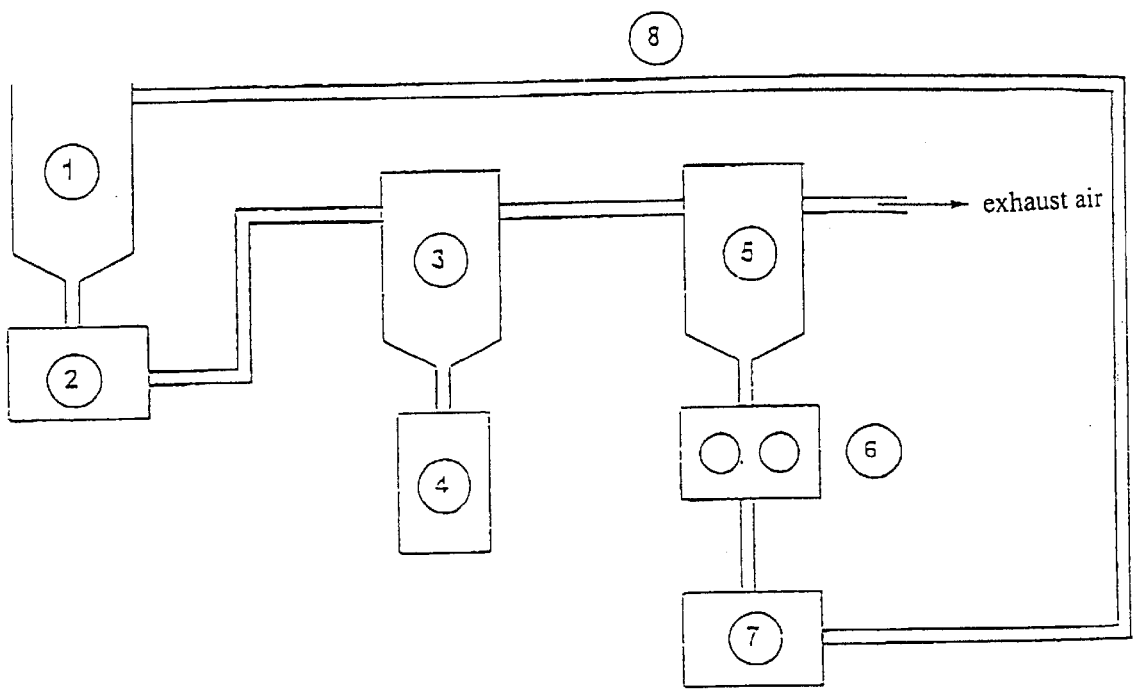

CONTINUOUS METHOD FOR REUSING COATING POWDER WASTE AND COATING POWDERS THUS OBTAINED

This invention relates to a process for the continuous working up and reuse of ground powder coating waste, which substantially comprises by-products from powder coating production, for the production of powder coatings without loss of quality.

Since no solvent emissions occur on application, crosslinkable powder coatings are an environmentally friendly alternative to liquid lacquer systems containing solvent. As a result, the use of powder coatings has risen sharply in recent years.

Crosslinkable powder coatings conventionally consist of one or more polymeric binders, curing agents, pigments and extenders together with additives. The powder coating production process may be divided into the following steps:

1. the constituents of the powder coating are vigorously premixed in the required quantity ratios as dry solids.
2. the mixture is melted in an extruder at the lowest possible temperature in order to avoid premature crosslinking and vigorously mixed. This mixing plasticises the binder and curing agent and wets the pigments and extenders.
3. the resultant, optionally coloured extrudate is rolled out into a thin layer, cooled and broken into coarse pellets.
4. the pellets are ground in a mill to form the finished powder coating.

In general, the fine fraction of a particle size of <10 $\mu$m, which are unavoidable in the grinding process, are removed in a subsequent screening process. The resultant powder typically has an average particle size of 40 to 70 $\mu$m.

Powder coatings are generally produced in a batch process. Conventional compositions and the classic production process for powder coatings are described, for example, in the monograph *The Science of Powder Coatings* vol. 1 and 2 (ed. D. A. Bate, London 1990).

The aim of the grinding process is to produce a powder having a narrow particle size distribution and the smallest possible content of fine fraction, as a large content of fine fraction has a negative impact on the processability of the powder coating by electrostatic spraying. In general, the fine fraction of a particle size of below 10 $\mu$m are separated by suitable processes, for example using a cyclone. These fine fractions conventionally amount to approx. 2 to 5 wt.%. If the average particle size of the powder is reduced, which is frequently preferred from a technical standpoint, there is a sharp increase in the content of fine fraction with a particle size of <10 $\mu$m, as grinding always gives rise to a relatively wide particle size distribution. Powder coatings having a low average particle size and a narrow distribution of the grain size range are desirable, for example, for producing thin lacquer layers (B. Fawer, *Powder Coating*, October 1996, p. 56).

The fine fraction from the grinding process is accordingly a by-product in the production of powder coatings and in many cases must be disposed of as industrial waste.

DE 4028567 A1 describes the recirculation of the overspray arising during use of powder coatings and the mixing thereof with the starting materials for a new batch of powder coating. This mixture is then further processed using conventional extruders. This processing involves fusing the constituents, in particular also the overspray, and exposing them to elevated temperatures. This process has the disadvantage that homogeneous mixing is difficult due to the small particle size of the overspray, problems occur with feeding the mixtures into the extruder and some fractions of the resultant powder coating are repeatedly exposed to elevated temperatures.

WO 96/15891 describes a process which avoids the problem of metering and feeding fines by compacting the fine powder in a tabletting press. The resultant tablets are then mixed with the remaining starting materials for a new batch of powder coating and introduced into the extruder. One essential condition which is stated for compacting is that the original particles must be "substantially still discernible" in the tablets.

EP 0 683 199 A2 describes a process for the recirculation of fine fraction into the starting mixture in powder coating production before the extrusion step by thermal sintering of the powder by distributing the fines on a surface, agglomerating them thereon, whereupon they may be apportioned to the starting mixture in a suitable quantity as relatively large particles.

A feature common to all these processes is that the fine fraction or powder residues are recirculated to the first stage of powder coating production. The material has to pass again through the entire powder coating production process. This approach has the disadvantage in principle that the material is again melted and exposed to elevated temperatures in the extruder. Since, in many cases, powder coatings are thermally crosslinking systems, repeated extrusion degrades the quality of the powder coating, especially if a large proportion of fines is used.

DE-C 19703376 describes a process for reusing finely divided powder coating residues, in which the powder coating residues are agglomerated and returned to the powder coating production process. The extrusion step may optionally be omitted in this process and grinding may be performed directly to yield reusable powder coatings.

The batchwise working up method described in DE-C 19703376 may result in known logistical problems relating to the necessary storage and transport conditions. The agglomerated powder coating, for example produced from overspray residues, is generally supplied to the powder coating manufacturer by the powder coating user in order to be reused.

The object of the present invention is accordingly to provide a simplified process for working up ground powder coating waste which facilitates the reutilisation thereof and avoids the stated logistical problems. The process is intended to give rise to a homogeneous powder coating of undiminished quality.

It has been found that this object may be achieved by the process provided by the present invention for working up powder coating waste by compacting the powder coating waste without complete melting to yield a sintered product, wherein the powder coating waste is continuously separated in the powder production process after the grinding step, continuously compacted, optionally broken up and continuously ground together with fresh material to be ground of the same batch of powder coating without extrusion to yield a powder coating.

The present invention also provides the powder coatings obtainable from the process according to the invention.

In the process according to the invention, powder coating waste, in particular the fine fraction arising in the grinding process, are continuously separated, for example using a cyclone or filter, directly compacted and the compacted product reintroduced into the mill, preferably together with the original coarse pellets from the same batch.

This method has the advantage that the fine fraction is directly reincorporated into the same batch. There are consequently no problems with colour deviations and the known logistical problems of a discontinuous method are avoided.

The continuous mode of operation moreover makes it possible to keep the powder coating waste in a sealed system. Especially when using the fine fraction, this is advantageous for reasons of occupational hygiene and quality assurance. The problems described in DE-C 19703376 relating to conveying the fine fraction, for example in pipework, are also avoided.

The process according to the invention is thus particularly advantageous for the continuous production of powder coatings having a small average particle size and narrow distribution, as large quantities of fine fraction are produced in such processes which may be directly reused.

For example, it is possible to produce a powder having an average particle size (d50) of 30 $\mu$m, which after the classifying operation has a content of fine fraction of <10 $\mu$m of less than 15%, in particular of less than 10%, without significant quantities (<2%) of fine powder being produced.

If such a particle size distribution is to be achieved without using the process according to the invention, it is necessary to separate approx. 12% of fine powder of <10 $\mu$m and dispose of it or reincorporate it in a complex manner in the extruder for the production of a new batch of the same product. Continuous compaction of the fine fraction thus permits considerable savings of raw materials, as in this example, for a given quantity of powder coating, approx. 10% less material to be ground need be produced by extrusion. It is also possible to produce powders having an average particle size of <30 $\mu$m, for example of 20 to 25 $\mu$m. In this case, the quantity of fine fraction to be compacted increases sharply, which results in a higher throughput and energy consumption of the compacting apparatus, but has no negative impact on the quality of the powder coating.

The process according to the invention may be used for any desired powder coatings, for example for clear powder coat or for coloured powder coat, for example based on epoxy, polyester, polyurethane or acrylate resins.

Compacting conditions may be selected as a function of the type of powder coating used. If compaction is weak, as is for example intended in the process for the production of tablets analogously to WO 96/15891, the compacted material breaks back down into the initial fine powder in the mill. If the material is too strongly compacted, frictional heating brings about an excessive rise in temperature, which results in the powder largely being melted. The melted powder sticks firmly to the compacting apparatus and may only be removed again with considerable effort. Moreover, the powder is exposed to very high temperatures, such that the quality of the resultant powder coatings may be impaired. In the process according to the invention, compaction is intended to proceed in such a manner that the fine fraction is sintered together without the powder grains being completely melted and that the sintered parts are broken up into new grain structures on grinding.

Optimum compacting conditions are dependent both upon the powder coating used and upon the compacting apparatus. During compaction, an elevated temperature arises on the surface of the roll presses, which causes the powder grains to sinter or agglomerate. In the case of powder coatings which crosslink at low temperature, the processing force may, for example, be adjusted such that the individual powder grains sinter together effectively but do not melt. In the case of powder coatings which crosslink at higher temperatures, a higher force and thus also consequent temperature may, for example, be set. It is optionally possible to provide the compacting apparatuses with external heating or cooling, for example the rolls may be cooled with water.

Any known compacting apparatuses are, in principle, suitable for the process according to the invention, such as ram presses, ram extruders, in particular two-roll presses or ring-roll presses. In this case, the compression force in the roll presses is determined by the gap, the rotational speed and quantity of feed material. The parameters may readily be adjusted relative to each other. The compression force is stated as a specific compression force in N per cm of roll width. In general, the specific compression force should be greater than 4 kN/cm, with a value of above 6 kN/cm in particular being favourable. Specific compression forces are, for example, in the range from 10 to above 30 kN/cm and up to 100 kN/cm. Excessive compression force may be recognised from the powder largely becoming melteded, i.e. the composition strings and sticks to the rolls. Excessively low compression forces give rise to greatly increased fines content in the grinding process. Two-roll presses having textured surfaces have proved particularly suitable, those having tablet-shaped indentations being less suitable than those having a corrugated surface.

In the event that compaction yields product which, by virtue of its dimensions, is unsuitable for a grinding operation, the product may be broken up, for example to form chips or pellets. Breaking may be performed with conventional apparatus usable for powder coating production, for example using so-called pin crushers.

The compacted product is continuously returned together with fresh material to be ground into comminution apparatuses conventional for powder coatings, such as for example impact mills or classifier mills, which permit the production of the powdered coatings under gentle conditions. This gives rise to the further advantage of the process according to the invention which is that working up proceeds within the conventional powder coating production process and requires no additional grinding plant. Before classification, the powder coatings obtained from the compacted pellets have a fine fraction content comparable to that of conventional powder coatings, the fine fraction content for example usually being below 25%, optionally even below 15%.

The mode of operation according to the invention provides a process which avoids the disadvantages. of the known prior art in the reprocessing of fine powders and other powder coating waste, in particular additional heating or melting steps. Moreover, the storage and conveying of fine fraction from powder coating production are avoided. The fine fraction arising in particular in the grinding process during powder production may be worked up using the method according to the invention by compaction and grinding to yield a high grade powder, without an extrusion step being required. Neither the grain size range of the resultant powder nor the quality of the coatings produced from the powder differs from conventional powder coatings.

It is even possible to produce powder coatings having a narrower grain size range and a smaller average particle size, without there being any need to dispose of large quantities of by-product or to perform costly re-extrusion.

FIG. 1 shows an example of the process according to the invention using a block diagram. The powder coating pellets originating from the powder production process pass from a storage tank (1) into a mill (2) and are ground therein to form the finished powder coating. The powder coating is then passed into a cyclone (3) to separate unwanted grain sizes, for example the fine fraction. The finished powder coating is packaged (4), while the fine fraction pass via another cyclone or a filter (5) to separate the exhaust air stream into the compactor (6). After the compaction process, the compacted material is broken up into a coarse material to be ground (7) and this material is returned, for example by means of pneumatic conveying (8) into the storage tank (1), where it is mixed with fresh powder coating pellets and reground to yield powder coating.

The following Examples illustrate the invention. The compression force of the rolls is stated as a specific compression force per cm of roll width (kN/cm).

EXAMPLE 1

18 kg of fine fraction of <10 μm (average grain size approx. 4 μm) from the grinding of a conventional thermally crosslinkable white powder coating based on an epoxy/polyester hybrid (49% polyester, 21% epoxy, 29% titanium dioxide and 1% additives) are compacted at a compression force of 8 kN/cm using a Bepex two-roll compactor with a roll having a textured surface at a throughput of approx. 25 kg/h. The resultant compacted homogeneous strand, which is mechanically stable, was comminuted in a crusher into chips of approx. 2 cm in diameter. These chips are ground in a mill (model ACM 2, manufacturer Hosokawa) using the conditions conventional for powder coatings. A powder is obtained having an average particle size of 45 μm and a fraction of <10 μm of <15%.

The powder was electrostatically sprayed using a corona gun onto aluminium sheet and stoved for 20 minutes at 180° C. A defect-free coating is obtained having properties which do not differ from those of a coating which is obtained directly with the above-mentioned uncompacted powder coating.

EXAMPLE 2

16 kg of fine fraction of <10 μm (average grain size approx. 4 μm) from the grinding of a black pigmented thermally crosslinkable epoxy-based powder coating with a dicyanogen crosslinking agent are compacted at a compression force of 14 kN/cm using a Bepex two-roll compactor with a roll having a textured surface at a throughput of approx. 22 kg/h. The resultant compacted homogeneous strand, which is mechanically stable, was comminuted in a crusher into chips of approx. 2 cm in diameter. These chips are ground in a mill (model ACM 2, manufacturer Hosokawa) using the conditions conventional for powder coatings. A powder is obtained having an average particle size of 37 μm and a fraction of <10 μm of <14%.

The powder was electrostatically sprayed using a corona gun onto aluminium sheet and stoved for 20 minutes at 180° C. A defect-free coating is obtained having properties which do not differ from those of a coating with a powder which has not been worked up.

EXAMPLE 3

20 kg of fine fraction of <10 μm (average grain size approx. 4 μm) from the grinding of a conventional thermally crosslinkable polyester-based powder coating with triglycidyl isocyanurate (TGIC) as crosslinking agent (55.8% polyester, 4.2% TGIC, 29% titanium dioxide and 1% additives) are compacted at a compression force of 20 kN/cm using a Bepex two-roll compactor with a roll having a textured surface at a throughput of approx. 20 kg/h. The resultant compacted homogeneous strand, which is mechanically stable, was comminuted in a crusher into chips of approx. 2 cm in diameter. These chips are ground in a mill (model ACM 2, manufacturer Hosokawa) using the conditions conventional for powder coatings. A powder is obtained having an average particle size of 27 μm and a fraction of <10 μm of <25%.

The powder was electrostatically sprayed using a corona gun onto aluminium sheet and stoved for 20 minutes at 180° C. A defect-free coating is obtained having properties which do not differ from those of a coating with the uncompacted powder coating.

EXAMPLE 4

16 kg of fine fraction of <10 μm (average grain size approx. 4 μm) from the grinding of a grey pigmented, wax-modified, thermally crosslinkable epoxy-based powder coating with dicyanogen as curing component are compacted at a compression force of 16 kN/cm using a Bepex two-roll compactor with a roll having a textured surface at a throughput of approx. 27 kg/h. The resultant compacted homogeneous strand, which is mechanically stable, was comminuted in a crusher into chips of approx. 2 cm in diameter. These chips are ground in a mill (model ACM 2, manufacturer Hosokawa) using the conditions conventional for powder coatings. A powder is obtained. having an average particle size of 36 μm and a fraction of <10 μm of <20%.

The powder was electrostatically sprayed using a corona gun onto aluminium sheet and stoved for 20 minutes at 180° C. A defect-free coating is obtained having properties which do not differ from those of a coating which is obtained directly with the powder coating.

COMPARATIVE EXAMPLE 1

10 kg of fine fraction similar to Example 1 are compacted in a Bepex roll compactor with tabletting rolls to form tablets 10 mm in diameter and 3 mm in thickness, the force applied with the rollers being 4 kN/cm. Subsequent grinding of the tablets in a mill (model ACM 2, manufacturer Hosokawa) yielded a powder with an average particle size of <10 μm. This powder behaves like the introduced fine fraction and cannot be processed in conventional powder coating processing plant.

EXAMPLE 5

8 kg of fine fraction from Example 3 are compressed with an Alexanderwerk two-roll compactor (model WP 50N 75) with a compression force of 9 kN/cm of roll width and a throughput of approx. 80 kg/h to yield a mechanically stable, homogeneous strand, which is coarsely comminuted mechanically and then ground in a mill (model ACM2, manufacturer Hosokawa) under the conditions conventional for powder coatings. A powder is obtained having an average particle size of 35 μm and a fraction of <10 μm of 19%.

EXAMPLE 6

9 kg of fine fraction from Example 3 are compressed with an Alexanderwerk two-roll compactor (model WP 50N 75) with a compression force of 12 kN/cm of roll width and a throughput of approx. 50 kg/h to yield a mechanically stable, homogeneous strand, which is coarsely comminuted mechanically and then ground in a mill (model ACM2, manufacturer Hosokawa) under the conditions conventional for powder coatings. A powder is obtained having an average particle size of 32 μm and a fraction of <10 μm of 15%.

COMPARATIVE EXAMPLE 2

5 kg of fine fraction from Example 3 are compressed with an Alexanderwerk two-roll compactor (model WP 50N 75) with a compression force of 4 kN/cm of roll width and a throughput of approx. 100 kg/h to yield a mechanically stable, homogeneous strand, which is coarsely comminuted mechanically and then ground in a mill (model ACM2, manufacturer Hosokawa) under the conditions conventional for powder coatings. A powder is obtained, more than 40% of which consists of particles of <10 µm and which is unsuitable for use as a powder coating.

EXAMPLE 7

In a plant according to FIG. 1, 581 kg of fresh material to be ground of a white pigmented powder coating based on 50:50 epoxy/polyester are ground in a Hosokawa ACM 20 classifier mill and passed into a cyclone separator to separate the fine fraction. The fine fraction passes into another cyclone separator and thence into an Alexanderwerke WPN 50N75 roll compactor. Once the compacted material has been broken up with a pin crusher, the resultant product is returned to the mill holding tank with powder coating from the same batch. The operating conditions of the mill and the two cyclones are selected such that a powder coating having an average grain size of 28 µm and a fine fraction content of <10 µm of <15% is obtained.

The compactor was operated at a specific compression force of 21.3 kN/cm. 555 kg of powder complying with the specification are obtained (96% yield).

COMPARATIVE EXAMPLE 3

In a similar manner to Example 7, the same material to be ground is ground under identical conditions, but without compaction and recirculation of the compacted material. When 594 kg of material to be ground are introduced, 520 kg of powder complying with the specification are obtained (88% yield).

What is claimed is:

1. A process for reprocessing powder wastes from a powder coating production to provide a re-usable powder which comprises
   a) continuously removing powder coating wastes arising during powder coating production,
   b) continuously compacting the powder wastes using a press selected from the group consisting of a two roll press and a ring roll press, without completely melting the powder, to provided a sintered product, and
   c) continuously grinding the compacted sintered product with fresh powder coating to yield a powder composition without passing said powder coating composition through an extrusion process; wherein the powder coating composition has a particle size distribution in which at least 50 percent by volume of the powder particles have a particle size of 20 to 45 µm and in which a proportion that has a particle size of less than 10 µm is equal to or less than 15 percent by volume.

2. A process according to claim 1 wherein the powder waste comprises excessively finely divided fractions of powder obtained in the production of powder coating.

3. A process according to claim 1 wherein the compacting is performed by a two-roll press.

4. A process according to claim 3 in which the two-roll press uses a specific compression force between 4 kN/cm and 100 kN/cm.

5. A process according to claim 3 in which the two-roll press uses a compression force between 5 kN/cm and 50 kN/cm.

6. A process according to claim 1 wherein the particle size of the powder waste used has an average diameter of <10 µm.

7. A powder composition obtained by the process of claim 1.

8. A process according to claim 1 wherein the compacting is performed by a ring-roll press.

9. A process according to claim 8 in which the ring-roll press uses a specific compression force between 4 kN/cm and 100 kN/cm.

10. A process according to claim 8 in which the ring-roll press uses a compression force between 5 kN/cm and 50 kN/cm.

* * * * *